July 25, 1950  E. RUCH  2,516,648

WORK CLAMP

Filed May 27, 1948

Eugene Ruch
INVENTOR.

BY *Clarence A. O'Brien*
*and Harvey B. Jackson*
Attorneys

Patented July 25, 1950

2,516,648

UNITED STATES PATENT OFFICE 2,516,648

WORK CLAMP

Eugene Ruch, Farmington, Mich.

Application May 27, 1948, Serial No. 29,521

3 Claims. (Cl. 90—60)

My invention relates to improvements in work clamps for setting up work of round or polygonal cross-section in drill presses, especially, although, as will presently appear, the invention is adapted to be used otherwise than in drill presses solely, for instance, in milling machines and surface grinders.

The primary object of my invention is to provide a V-block clamp especially designed to leave the entire top of the work clear and readily accessible for drilling, or tapping, regardless of the size of the stock and especially as regards stock of very small cross-section.

Another object is to provide a clamp of the type and for the purpose specified having at least three sides of the block clear for use in setting up in a drill press, or the like, and with small sizes of stock, all four sides clear.

Still another object is to provide against parts of the clamp working loose and rendering the clamp insecure.

Other and subordinate objects, within the purview of my invention, together with the precise nature of my improvements will be readily understood when the succeeding description and claims are read with reference to the drawings accompanying and forming part of this specification.

Figure 1:
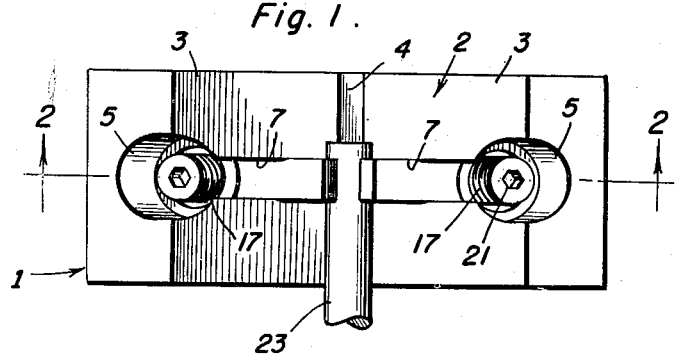
Figure 1 is a view in plan of my improved clamp in a preferred embodiment thereof.
Figure 2:
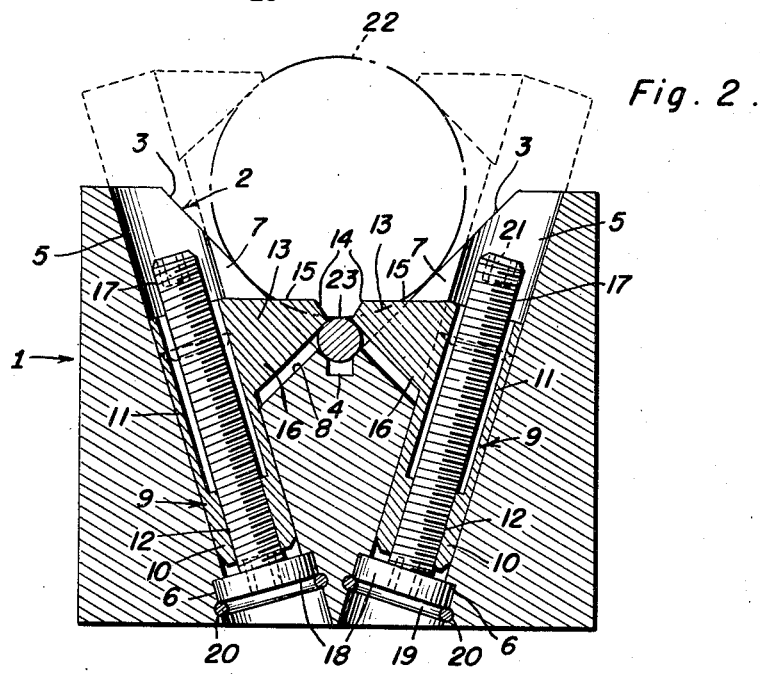
Figure 2 is a view in cross-section taken on the line 2—2 of Figure 1.
Figure 3:
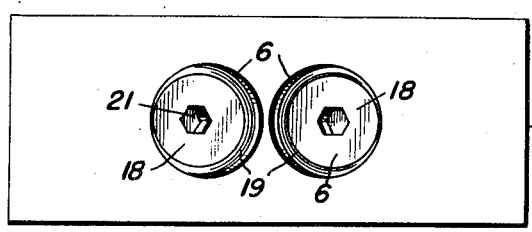
Figure 3 is a view in bottom plan.

Referring now to the drawings by numerals, and first to Figures 1 to 3 thereof, the work clamp of my invention comprises a rectangular block 1 with a V-groove 2 in the top and center thereof having side walls 3 in ninety degree angular relation and a bottom, apex, channel 4 providing for small cross-section stock, or work, seating firmly in the bottom of said groove 2, in a manner which will be understood.

A pair of bores 5 extend downwardly in said block 1 at opposite sides of the groove 2 in downwardly converging relation, at an acute angle, with enlarged bottom ends 6. The bores 5 may be round, as shown, or otherwise formed, and the angle of convergence thereof may vary as may be found desirable. As will be understood, the bores 5 lie in a common plane at a right angle to the V-groove 2.

A pair of guide slots 7 extend from the walls 3 of the groove 2 to the bores 5 in the plane of said bores with bottoms diverging relatively from said walls 3, adjacent the bottom of the groove 2, and at opposite sides of the channel 4 at right angles to said walls 3. The purpose of the slots will presently be seen.

A pair of clamps 9 are provided in the block 1 comprising a pair of cylindrical clamp stems 10, shorter than the bores 5, with axial bores 11 and reduced lower end, counterbores 12 and which are slidably fitted in said bores 5 with radial, upper end, flat jaws 13 extending through the slots 7 part-way into the V-groove 2 in opposed spaced apart relation. The jaws 13 are of truncated cone shape to provide outer, spaced apart, thin tips 14 diverging relatively upwardly, horizontal, aligned top edges 15, and bottom edges 16 parallel with the bottoms 8 of the slots 7, all for a purpose presently explained.

A pair of clamp operating screw bolts 17 having heads 18 are threaded through the counter-bores 12 with the heads 18 fitting in the enlarged bottom ends 6 of the bores 5 and locked in said ends by snap rings 19 fitted in grooves 20 in said ends. Polygonal sockets 21 are formed in the ends of the screw bolts 17 for turning the same with a tool from either end.

In operating the described clamp, the clamps 9, by operation of the screw bolts 17, at either end thereof, may be extended out of the top side of the block 1 to clamp large size work 22 in the V-groove 2, as shown by dotted lines in Figure 2. On the other hand, said clamps 9 may be operated from either end entirely within the confines of the block 1 to clamp small sizes of work, as at 23, in the bottom of the V-groove 2. In all clamping operations of which the clamp is capable of performing, the work is gripped by the jaws 13 at opposite sides of the top of the work and said jaws are spaced apart sufficiently to clear the top on opposite sides of the vertical center of the work, for drilling, tapping or other purposes. The described shape of the jaws 13 and of the bottoms 8 of the slots 7 provide for accomplishing this result with very small work, as illustrated in Figure 2. Except when the clamps 9 are extended above the top side of the block 1, all sides of said block are clear for use in setting the block in a drill press, or other metal working machine, and when the clamps 9 are retracted completely into the block 1, all sides of said block are then clear for the same purpose. The snap rings 19 frictionally lock the screw bolts 17 against turning so that the clamps 9 are not liable to work loose. By having the top edges 15 of the jaws 13 horizontal and aligned, said jaws may be retracted into the block 1 as soon as the stems are so retracted completely.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention what is claimed as new is:

1. In a device of the class described a polygonal block having a groove in one side thereof with side walls converging toward the bottom of the groove for supporting elongated stock of different sizes in cross-section, said walls having a pair of opposed co-planar slots therein, a pair of opposed flat jaws slidable edgewise in said slots toward the bottom of said groove at opposite sides of the same and projecting out of said slots to engage the stock and clamp the same against said walls, and manipulative means for moving said jaws toward the bottom of said groove in relatively converging paths and spaced apart relation to engage stock of different sizes with said jaws spaced apart.

2. In a device of the class described a polygonal block having a groove in one side thereof with side walls converging toward the bottom of the groove for supporting elongated stock of different sizes in cross-section, said walls having a pair of opposed co-planar slots therein, a pair of opposed flat jaws slidable edgewise in said slots toward the bottom of said groove at opposite sides of the same and projecting out of said slots to engage the stock and clamp the same against said walls, and manipulative means for moving said jaws toward the bottom of said groove in relatively converging paths and spaced apart relation to engage stock of different sizes with said jaws spaced apart, said means comprising tubular stems for said jaws endwise slidable in said block, and screw feed means for sliding said stems.

3. In a device of the class described a polygonal block having a groove in one side thereof with side walls converging toward the bottom of the groove for supporting elongated stock of different sizes in cross-section, said walls having a pair of opposed co-planar slots therein, a pair of opposed flat jaws slidable edgewise in said slots toward the bottom of said groove at opposite sides of the same and projecting out of said slots to engage the stock and clamp the same against said walls, and manipulative means for moving said jaws toward the bottom of said groove in relatively converging paths and spaced apart relation to engage stock of different sizes with said jaws spaced apart, said means comprising stems for said jaws endwise slidable in said block, screw feed means for sliding said stems, and friction locking means for said screw feed means.

EUGENE RUCH.

REFERENCES CITED

The following references are of record in the file of this patent:

UNITED STATES PATENTS

| Number | Name | Date |
| --- | --- | --- |
| 1,845,438 | Parkhurst | Feb. 16, 1932 |
| 2,288,218 | Warren | June 30, 1942 |
| 2,343,088 | Sherman | Feb. 29, 1944 |